(12) United States Patent
Antoniac (10) Patent No.: US 9,207,771 B2
(45) Date of Patent: Dec. 8, 2015

(54) GESTURE BASED USER INTERFACE (71) Applicant: Augumenta Ltd., Oulu (FI)

(72) Inventor: Peter Antoniac, Oulu (FI)

(73) Assignee: Augmenta Oy, Oulu (FI)

( * ) Notice: Subject to any disclaimer, the term of this patent is extended or adjusted under 35 U.S.C. 154(b) by 73 days.

(21) Appl. No.: 14/175,830

(22) Filed: Feb. 7, 2014

(65) Prior Publication Data

US 2015/0009124 A1    Jan. 8, 2015

Related U.S. Application Data

(60) Provisional application No. 61/843,689, filed on Jul. 8, 2013.

(51) Int. Cl.
*G06F 3/01* (2006.01)
*G06K 9/00* (2006.01)

(52) U.S. Cl.
CPC ............ *G06F 3/017* (2013.01); *G06K 9/00389* (2013.01)

(58) Field of Classification Search
CPC ..................................................... G06F 3/017
USPC .............................................. 345/156
See application file for complete search history.

(56) References Cited

U.S. PATENT DOCUMENTS

2009/0040215 A1\* 2/2009 Afzulpurkar et al. ......... 345/419
2012/0306615 A1\* 12/2012 Lee et al. ..................... 340/5.51

\* cited by examiner

*Primary Examiner* — Shaheda Abdin
(74) *Attorney, Agent, or Firm* — Ziegler IP Law Group, LLC (57) ABSTRACT

A system and method for recognition of hand gesture in computing devices. The system recognizes a hand of a user by identifying a predefined first gesture and further collects visual information related to the hand identified on the basis of the first predefined gesture. The visual information is used to extract a second gesture (and all other gestures after the second) from the video/image captured by the camera and finally interpreting the second gesture as a user input to the computing device. The system enables gesture recognition in various light conditions and can be operated by various user hands including the ones wearing gloves.

20 Claims, 6 Drawing Sheets

GESTURE BASED USER INTERFACE

TECHNICAL FIELD

The general area of the aspects of the present disclosure are directed to human computer interfaces, augmented reality, wearable and mobile devices. The aspects of the present disclosure generally relates to a system and a method for touch-free, natural hand-gesture based human to device interface.

BACKGROUND

Computing and communication devices including mobile phones have changed substantially in the last few decades. The emergence of personal computing in the later 1970s including both personal software (productivity applications, such as text editors and spreadsheets, and interactive computer games) and personal computer platforms (operating systems, programming languages, and hardware), made everyone in the world a potential computer user. Human interaction with computers has come a long way from keyboard, mouse to touch screen and to hand gesture(s).

Using hand gestures has always been a powerful human-to-human communication modality. The expressiveness of hand gestures also allows for the altering of perceptions in human-computer interaction. Gesture recognition allows users to perceive their bodies as an input mechanism, without having to rely on the limited input capabilities of the devices. Possible applications of gesture recognition as ubiquitous input on a mobile phone include interacting with large public displays or TVs (without requiring a separate workstation) as well as personal gaming with LCD video glasses.

The prior art relates to the way a human could interact with a computer (such as a wearable or mobile device) using hands. Hand gestures are a natural way to communicate, and in fact some information can be passed via hand signs faster and simpler than any other way. As an example, major auction houses use hand gesture for bidding on multi-million auctions. Thus it seems natural that, as you see the information in front of you, you can use it with your hands.

Many gesture recognition algorithms have been implemented such as algorithms based on the color of the hand and using the HSV: Dadgostar, Farhad, and Abdolhossein Sarrafzadeh. "An adaptive real-time skin detector based on Hue thresholding: A comparison on two motion tracking methods." Pattern Recognition Letters 27, no. 12 (2006): 1342-1352. Mittal, Arpit, Andrew Zisserman, and Philip Ton. "Hand detection using multiple proposals." (2011).

Others have identified also ways to extract hands from the background using the hull and convexity defects with a static camera (like on a robot) recognition of the hands is possible: Pulkit, Kathuria, and Yoshitaka Atsuo. "Hand Gesture Recognition by using Logical Heuristics." HCI, 2012, no. 25 (2012): 1-7. Wang, Chieh-Chih, and Ko-Chih Wang. "Hand Posture recognition using Adaboost with SIFT for human robot interaction." In Recent progress in robotics: viable robotic service to human, pp. 317-329. Springer Berlin Heidelberg, 2008.

Another method is by using the facial detection (which is not useful when camera sits on user's body, like on the shoulder, top of the head, pocket or glasses): Dardas, Nasser H., and Nicolas D. Georganas. "Real-time hand gesture detection and recognition using bag-of-features and support vector machine techniques." Instrumentation and Measurement, IEEE Transactions on 60, no. 11 (2011): 3592-3607.

Conventionally, commercial systems such as Microsoft Kinect™ use stereo-vision combined with infrared light. This means that a light emitting diode ("LED") emits invisible light on specific frequency, and two cameras, a small distance from each other, capture the image at that exact light frequency. As the object closer to the camera produces or reflects significantly more light than those objects behind the object closest to the camera, it is easy to extract foreground images or objects from background images or objects and hence recognize the hands. In addition, two cameras capture two images, overlying them to correctly give a precise distance of the each point of an object providing a 3D picture. This system has superior recognition but it has drawbacks such as extra energy usage, bigger size, and more expensive. Another approach seen in some systems is to use special sensors (such as proximity, movement or still background etc.) that can capture movement and translate it into commands. These sensors can be on the user, inside the clothes, or in the proximity of the user, for instance on a desk near the user. These systems are complex to set up and expensive in terms of cost of materials as well as the energy usage.

Hence, there exists a need for a system and method that detects where the user's hands are, interprets the hand gestures in real-time, and is inexpensive. Also, there is a need for a system that overcomes user environmental variations such as exposure, lighting, background color, back-light, different user hands, skin color or wearing of gloves.

BRIEF SUMMARY

The aspects of the present disclosure provides a system and method for recognition of hand gesture in or by computing devices.

In one embodiment, the system includes one camera that can view a user's hands and a feedback interface that can provide feedback to the user, such as a visual display or other forms of acoustic or vibration feedback. The system is configured to recognize a hand of a user by identifying a first gesture, which in one embodiment is a pre-defined gesture and further collect visual information related to the hand identified on the basis of the first predefined gesture. Optionally, the system can use the visual information to extract a second (and all other gestures after the second) gesture from the video/image captured by the camera, and finally interpret the second gesture to enable user input. The system enables gesture recognition in various light conditions and can be operated by various user hands including the ones wearing gloves.

The system of the disclosed embodiments may optionally include a wearable camera, a head mounted camera or display, a near-the-eye display, or any other tactile or acoustic forms of feedback.

The system may optionally include a display, a microphone, or a speaker that allows a user to access information and interact with an information system while driving, operating on a patient, cooking or anything else that involves human computer interaction.

Optionally, the system is connected to Internet, and can send and receive information from anywhere.

In another aspect, embodiments of the present disclosure provide a method for recognition of hand gesture in or by computing devices.

In accordance with yet another embodiment of the present disclosure, the system is configured to work with devices which have at least one camera that can view a user's hands and a feedback interface that provides feedback to the user, such as a visual display or other forms of acoustic or vibration feedback. The device may or may not be connected to Internet. Typical examples of the devices include, although are not limited to, smart phones, Mobile Internet Devices (MID), wireless-enabled tablet computers, Ultra-Mobile Personal Computers (UMPC), phablets, wearable computer, tablet computers, Personal Digital Assistants (PDA), web pads and cellular phones. Other non-limiting examples include a car with centrally mounted camera and display on the windshield, or a house with a system of cameras and a voice feedback, or a feedback on the TV.

Additional aspects, advantages, and features of the present disclosure would be made apparent from the drawings and the detailed description of the illustrative embodiments.

It will be appreciated that features of the disclosure are susceptible to being combined in various combinations or further improvements without departing from the scope of the disclosure and this application.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein. Moreover, those in the art will understand that the drawings are not to scale. Wherever possible, similar elements have been indicated by identical numbers.

DESCRIPTION OF THE PREFERRED EMBODIMENTS

The present disclosure provides a system and method for recognizing the hand of the user in any conditions. The method relies on an initial gesture, called the opening gesture, after which the hands of the user are registered. Generally, the initial gesture is predefined. The information extracted from the initial gesture can also be used later. In embodiment, a registration or learning process is used to predefine movements to extract features. In such a learning process, the system can be provided with a set of predefined features that can then be compared to movements in order to extract those features, in a feature extraction process. Different feature extraction sets, which can include images, shapes and movements for example, can be defined in the registration or learning process.

The term "feature" as is used herein, generally refers to a piece of information relevant to solving a computational task involved in recognition of an object or shape of an object. More specifically, features can refer to the result of a general neighborhood operation (feature extractor or feature detector) applied to the image, specific structures in the image itself (edges, corners, curvature, etc. up to complex structures such as objects). Other examples of features are related to motion vectors in images, to shapes defined by contours or to properties of such a region (like mass, convexity, etc.).

In one embodiment, an opening gesture can be the open hand. Once the opening hand as the initial gesture is recognized, the system is then able to extract other gestures and track the hands. The opening gesture is also called the registration gesture or calibration gesture. The registration of the hands comprises a method in which the hand shape is known to the system, such as through the initial learning or registration process. Once the opening gesture, also referred to as an initial gesture or reference shape, is recognized, which might also be referred to as being detected or identified, the system is then able to extract one or more other shapes provided by, or detected in the camera image and compare them with the reference shape. Such other shape(s) should be recognizable and unique as such that it should allow the system to extract many features and should also be invariant between other possible shapes (invariant to rotation, or mirroring).

In one embodiment, the detection and recognition of a gesture can result in a command being issued. A "command" as that term is generally used herein, refers to a function or instruction that can be executed by a computing device. In one embodiment, the command can result in an action being performed by the computing device. The detection, interpretation or recognition of a gesture can result in one or more commands.

In one embodiment, the command(s) can be generated as a function or result of a single gesture (hand shaped in certain way), or a series of gestures (movements of hands while they are in certain shape, or while they are dynamically changing shape, such as the "come here" gesture, or a "no-no" gesture), or a series of relative movements with two hands, where one hand can give a reference point, while the other can define a relative movement. This method can be used to emulate a mouse movement as well.

Figure 1:
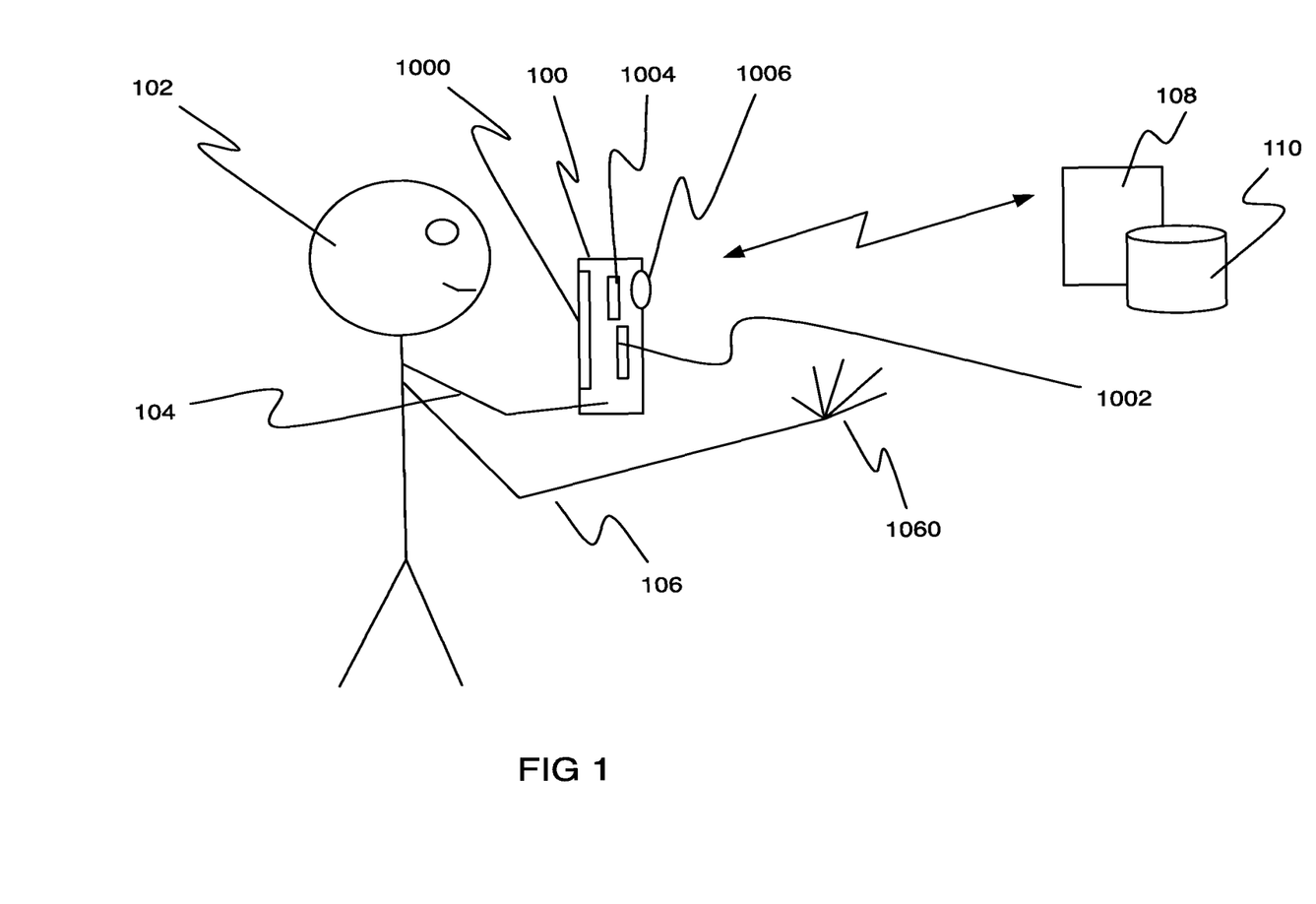
FIG. 1 shows a high level use case of a system incorporating aspects of the present disclosure.

Referring now to the drawings, particularly by their reference numbers, FIG. 1 shows a high level use case of one embodiment of a system incorporating aspects of the present disclosure. A user 102 has a portable or mobile computing device such as a smart phone 100 in his hand 104. The aspects of the disclosed embodiments are generally directed to portable and wearable electronic devices. The device 100 is positioned in the hand 104 in a way that the user can see a display 1000 view captured by a camera 1002 of the device 100. The system optionally performs image analysis in a central processing unit 1006 of the computing device 100 or other calculation unit of the device 100. The central processing unit 1006 can generally comprise a memory and a processor. The central processing unit 1006, or processor, can generally be configured to execute non-transitory computer or machine readable instructions, for carrying out the processes generally described herein. The system may also include a software product installed in a storage 1004 of the computing device 100, which can include removable and non-removable storage or memory. The software product can include machine readable instructions that when executed by the central processing unit 106, causes the central processing unit 1006 to execute or perform the steps needed to identify and recognize gestures made by user 102 with other hand 106. Gestures can include, for example, movements/poses made with palm 1060 of the hand 106. It is noted that while reference is made to the palm 1060 of the hand 106, the aspects of the disclosed embodiments are not so limited and can include other features of the hand 106, such as for example fingers. The software product can be standalone product or it can be part of the operating system of the system or central processing unit 1006 to enable other software products to utilize gesture recognition or it can be provided as library component for software developers to include gesture recognition capabilities. In preferred setup the software product is part of the operating system platform and it can be used/linked/complied as part of other software products. Based on alternative embodiments the device 100 may use a communication module to send some or all captured video/still images to an external computing environment such as server system 108 with databases 110 for processing and determining the type of gestures.

In one embodiment, the system 100 uses a single camera that captures the images of one or more of the user's hands, or aspects of one or more of the user's hands. In alternate embodiments, it is contemplated that any suitable number of camera, or other image capturing devices can be used, such as two or more cameras. The hands of the user 104 can be covered with gloves. The camera 1004 can be any basic image capturing device, such as a color or digital camera. The system 100 can give feedback to the user in any form visual, tactile, audio, etc.

Figure 2:
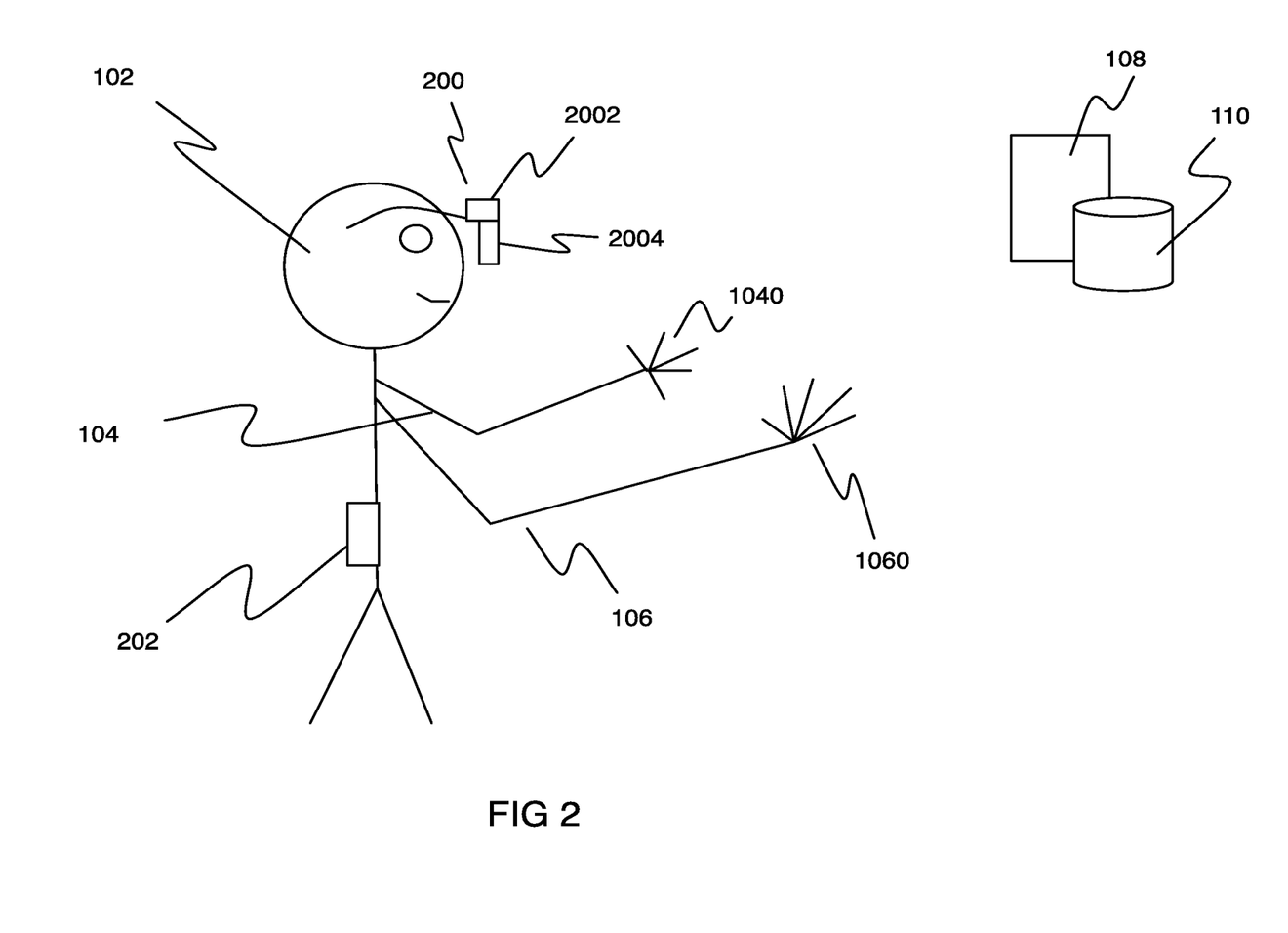
FIG. 2 illustrates example of use case of the one embodiment of the system of the present disclosure with head mounted display.

Referring to FIG. 2, an example of use case of a system incorporating aspects of the present disclosure includes a computing device with a head mounted display 200 which can be worn by the user. The head mount display system 200 can include camera 2002 and display 2004. The display 2004 can be a semi-transparent display enabling the user to see thru the display 2004 and enabling the computing device to add information in the display 2004. This enables providing or making use of augmented reality. The head mount display system 200 can include processor, memory, and/or communication interface. The display system 200 can be configured to perform steps of gesture recognition a stand-alone unit or it can send some of the information to external system 108, 110 such as smart phone 202 in the pocket of the user or to the server directly or via the smart phone. The head mount display device 200 shown in FIG. 2 enables the user to use both hands 104 and 106 to make gestures in an easy way since there is no need to hold the device 200. Palms 1040 and 1060 of the hands 104 and 106 are typically used to make gestures.

As the term is used herein, "gestures" generally refers to movement of one or two or more hand(s) and/or palm of the hand or other part of the hand, such as the fingers. This can include the position of the hand, or any part thereof, in respect to captured video or environment. The pose of the hand/palm of the hand such as how fingers are posed, how many fingers are shown, how fingers are moving in respect to each other, or how the fingers are positioned in respect to each other finger. Additionally, gestures can refer to gestures used in sign language used by deaf people, for example.

Figure 3:
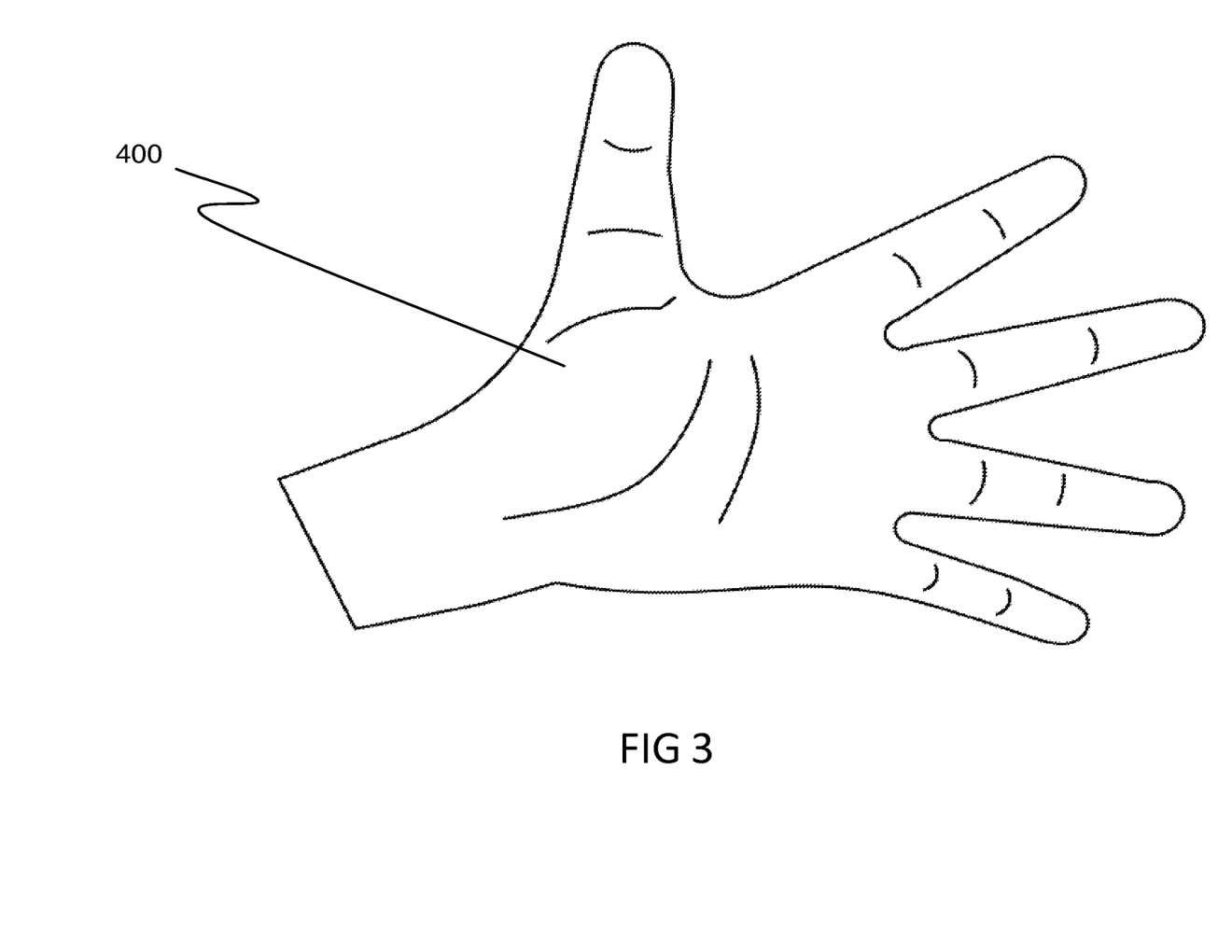
FIG. 3 presents an example of a hand gesture to initiate search command.
Figure 4:
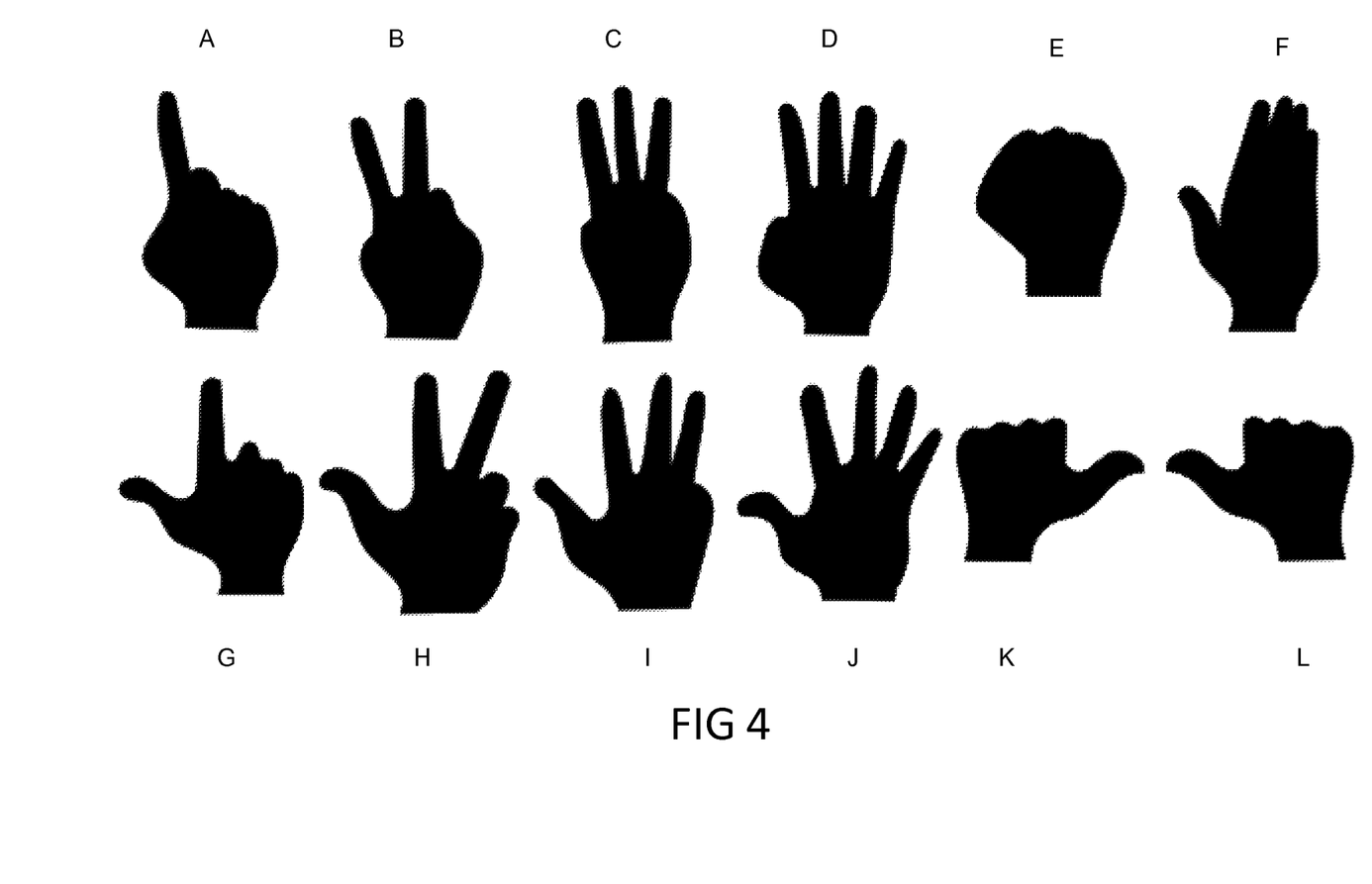
FIG. 4 illustrates gestures designated for letters A, B, C, D, E, F, G, H, I, J, K and L).

In a non limiting example, FIG. 3 presents an example of a hand gesture that can be used to initiate a search command. The system 100 can then use the "hand anthropometry" ratios to classify the shape as an open hand. FIG. 4 illustrates gestures designated for letters A, B, C, D, E, F, G, H, I, J, K and L. These gesture codes can be used by the system 100, together with other movements/poses made with palm 1060 of the hand 106, as an input that can lead to the generation of one or several commands for the execution of an action or function. In alternate embodiments, it will be understood that any suitable gesture can be used to define one or more codes, which when detected and interpreted, will lead to the generation of a command.

Figure 5A:
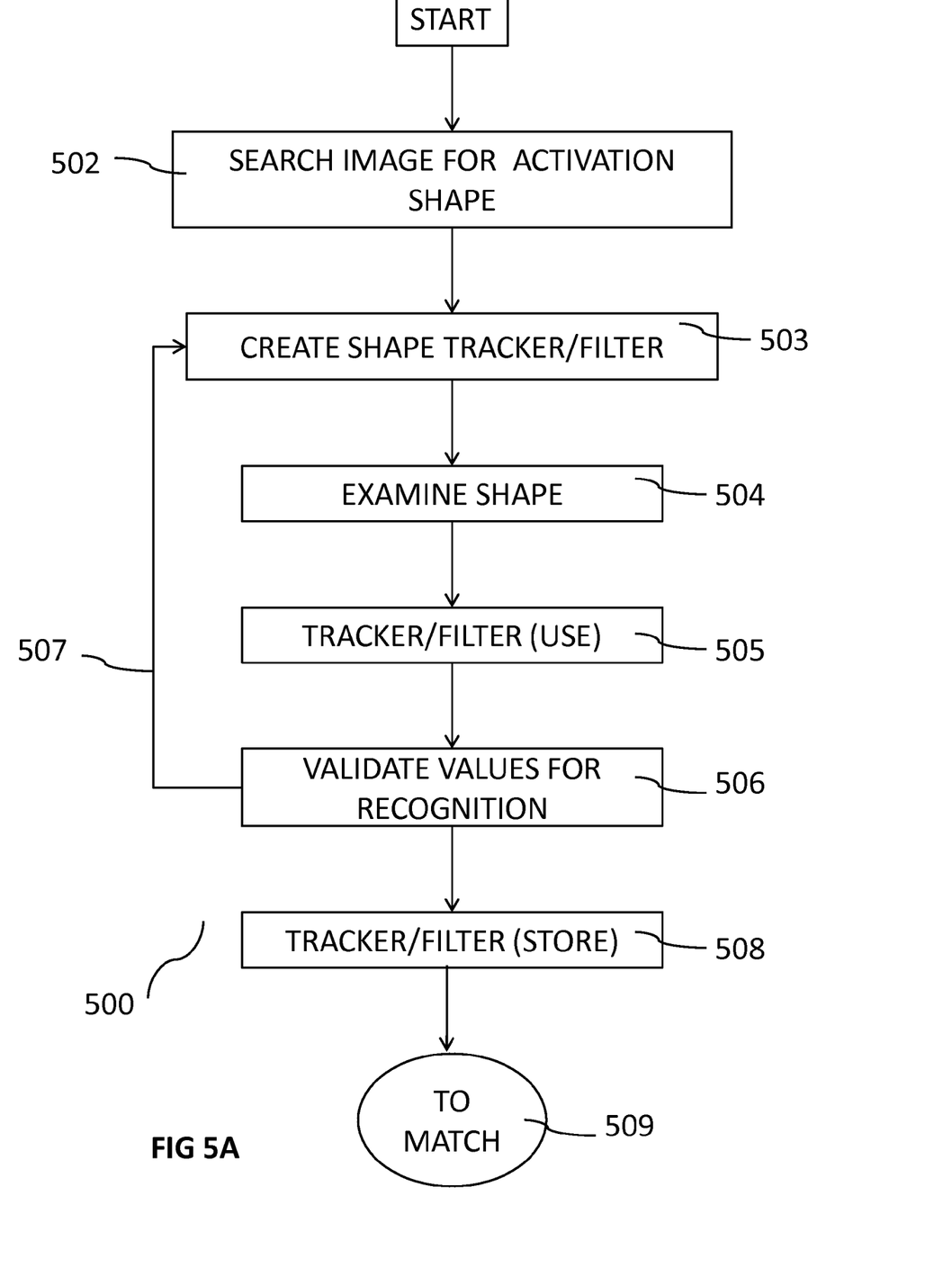
FIGS. 5A and 5B outlines steps performed by an embodiment of the system incorporating aspects of the present disclosure in a use case.
Figure 5B:
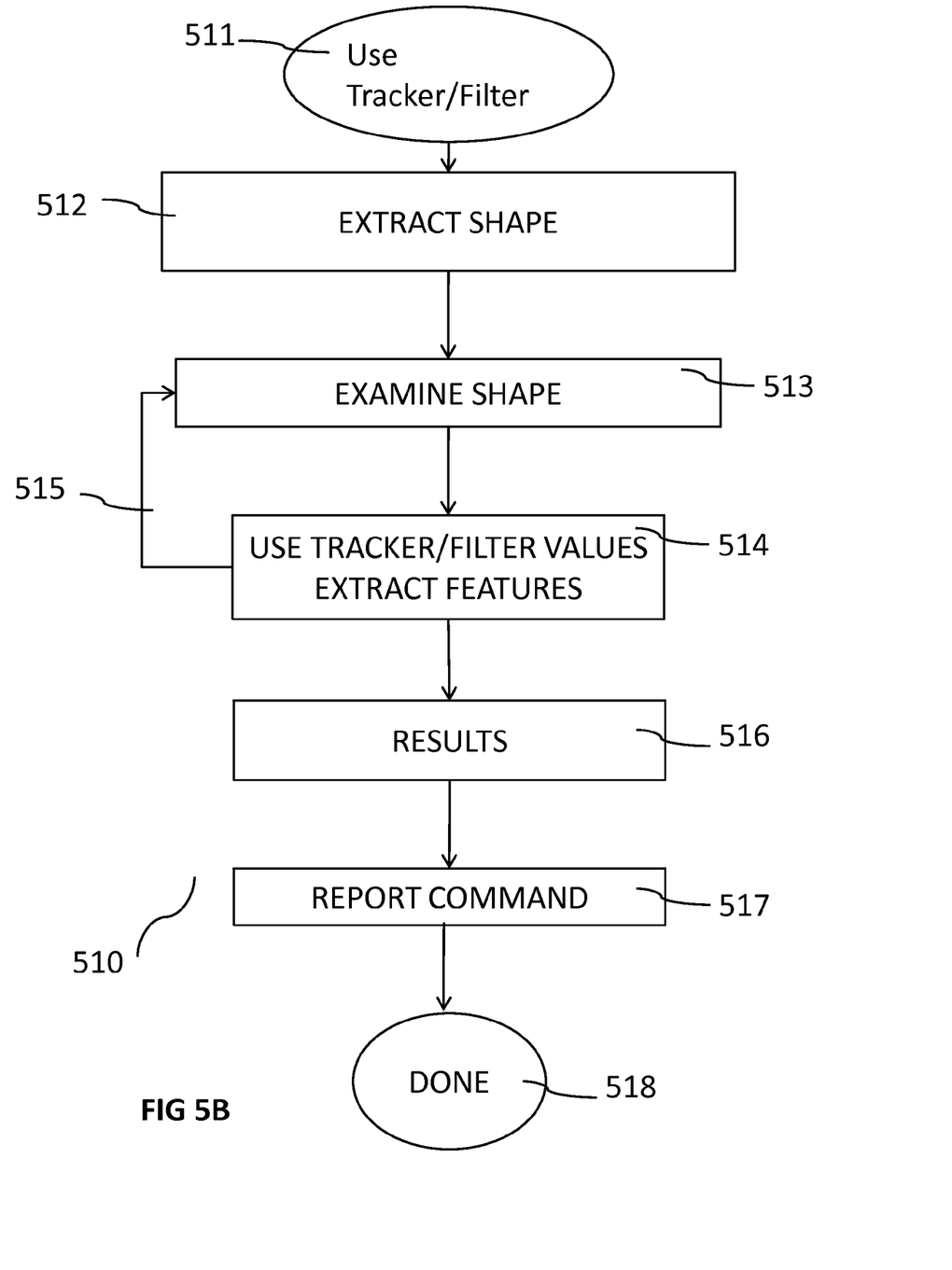

Referring to FIGS. 5A and 5B outlines steps performed by a system incorporating aspects of the present disclosure in a use case. Once an image is captured, the system broadly performs two steps, a Search 500 and Match 510. The search step 500 generally comprises the detection and recognition of the opening gesture. The match step 510 correlates the detected or identified gesture to a command that can be executed or performed by the system.

FIG. 5A outlines the search 500 step. In the search step 500, with no prior data, a search or similar analysis is performed of the captured image(s) for a predefined activation shape 501, also referred to herein as the initial or opening gesture. In one embodiment, the predefined shape is a template shape that is used by the system to trigger a calibration process. The predefined shape can be any predefined pose that the hand of the user can take. In one embodiment, the term "shape" can also include movement. In a non limiting example, the predefined shape to search in the captured image (s) is the shape of the open palm as referred in FIG. 3 of the present disclosure. In one embodiment, the system uses "hand anthropometry" ratios to classify the predefined shape as an open hand.

The system creates a shape tracker/filter 503 to identify and isolate or group, other objects in the captured image(s) or pictures. The objects can include anything else that is in the captured image(s). This can be done using color filters (called color blobs) or by means of motion vectors by tracking the objects that move or have been moved between frames, where the capture image includes more than one frame. The identified and isolated objects in the captured image(s) can be labeled. For example, groups of pixels that look similar can be grouped and called objects.

After the objects in the images have been labeled, the system examines the shape 504 of the labeled objects that are then used 505 against a search state that looks into the features of the objects and compares them to the known features of the predefined activation shape. The feature comparison 506 takes care of size variance, rotation, mirroring, and other variations in the 3D to 2D or rotation around all 3 axis. When the comparison concludes that the shape 504 is the predefined activation shape?, the process will store the values 508 (such as color, size etc) that lead to the positive result and use them to find the future shapes that the object (user's hand) will present. The search process can happen all the time (like in parallel with the matching). In one embodiment, the process continuously scans the image for a predefined activation shape until it detects 507 regardless of a previously detected one. Thus, even when a predefined activation shape is detected, the system continues to search for another predefined activation shape. This allows the system to adapt to colour or light variations, as well if the user decides to use gloves. The values of the past hits (matches) can also be used and combined in an adaptive manner so that they will give the best results 509 for tracking the future hands gestures. In one embodiment, common background objects can be removed in a filtering or other segregation process.

FIG. 5B outlines the Match step 510. In one embodiment, the system identifies the gesture provided by the user's hands after the search of predefined shape 500 for the predefined activation shape is completed. In Match 510 the results 509 of the search process 500 are used. The results 509 generally comprise a set of initial features, such as left hand, right hand, color etc. The matching process includes a more detailed examination of the shape 513 since it is looking for many gestures. The system identifies tracker/filter values extract features by comparing the results 509 with predefined signs in the system. A few non limiting examples of hand gestures have been outlined in FIG. 4 of this disclosure which show hand gestures designated for letters A, B, C, D, E, F, G, H, I, J, K and L. The process can compare the shape of the hand gesture, such as left hand, right hand until a match or close match is found 515. In this example, the features extracted from the image received from the camera are compared with the features defined as matching the desired shape. This process will result 516 with a gesture code that can be used by any information system computer, communication device, mobile phone, etc., as an input that can lead to an action command 517. Examples of such action commands 517 can include, but are not limited to, opening a page, moving to a next item, answering a call, etc.

In an non limiting example enabled by the process outlined in FIGS. 5A & 5B, the use case involves a phone call. In this example, the user receives a call. The user starts by placing their hands in the position or pose of an activation gesture that enables the system to recognize the hands in the pre-defined activation gesture. In this example, the activation gesture is an open palm. In alternate embodiments, the activation gesture can be any suitable pre-defined hand gesture. When the activation gesture is recognized, in one embodiment, the system can provide feedback to the user of the recognition of the activation gesture. Examples of such feedback can include, but are not limited to a visual indication, audio indication or tactile indication.

Once the activation gesture has been made by the user and recognized, the user then moves or configures the hand to provide a "thumbs up" gesture, which in this particular example means that the user wants to answer the call. This can be called the "command" gesture. In one embodiment, the system can provide the user with a prompt to provide the command gesture. For example, one the activation gesture is recognized, the system indicates to the user to provide a command gesture. The prompt can be in the form of a visual, audible, or tactile prompt. For example, the user can receive feedback or a prompt from the phone, for example voice signal asking, once the activation gesture has been validated, "do you want to take the call?" As the user makes the thumbs up gesture, the system will detect the thumbs up gesture and match or otherwise validate the gesture. In one embodiment, a confirmation from the phone, such as "Call answered" can be heard.

As another example, if the user wants to call someone, the user can use a gesture to activate the phone. In one embodiment, a menu item or list can be displayed, or a voice can be used to read the menu list to the user, such as in a hands free environment. Any other tactile or audio feedback is contemplated within the scope of the disclosed embodiments. The menu list can include numbered function selections for example which will allow the user to activate one or more functions of the phone, such as a calling function. The user can select a menu item by using hand gestures that correspond to the menu item, like "number 1, number 2, etc.

In one embodiment, the commands can be context sensitive. For example, a second gesture in a first image context can be used to provide a first command. The same second gesture in a second image context can be used to provide a second command, different from the first. Thus, the same gesture can be used to generate different commands, depending upon the context of the preceding gesture.

In one embodiment, a context or setting of the second gesture is determined before the second gesture is matched with a command. For example, in one embodiment, the context can correspond to an application that is open when the activation gesture is detected. Thus, when the activation gesture is detected, the currently active application on the device is identified. The detected second gesture is then matched to commands corresponding to the active application.

In another non limiting example for using the system 100, a user has a wearable video camera. The camera can be attached on clothes, head, eye-glasses, or even clipped in a way that the camera captures a view of the user hands such that the user himself would be able to look at them. The camera grabs or otherwise captures the images and sends them to the system. In one embodiment, where the images are or include colour, the system examines the colour images and groups the colors to form "color blobs". With black and white or grayscale images, the system might group the images and objects based on the degrees of black and white. The system optionally examines the previous frames such that it determines movement of one or more objects within the images and uses that information. The system then examines the shape of the color blobs or the moved objects and searches the color blobs or moved objects for one that resembles closely a predefined shape, such as an open hand. Once the system identifies an object as the pre-defined shape in the image(s), the system uses information associated with the identified shape to track the color or the movement of the identified shape in the image so that the system recognizes the same object in the future frames. The system can also identify the background image(s) and remove the background image(s) from the tracking in future images. This allows the system to auto-calibrate itself each time the user shows or otherwise presents the predefined activation shape to the camera. Once an object in the image(s) is identified as the pre-defined activation shape, subsequently detected gestures in the images are considered or correlated to hand gestures that the system interprets as command input(s) that can be used to operate the system or activate functions of the system. Some of the exemplary gestures that can be used to operate the system are shown in FIGS. 4 and 5.

In one embodiment, the aspects of the disclosed embodiments can be used to conserve or reduce power consumption of an electronic or computing device. In one embodiment, in computing device of the disclosed embodiments can be configured to run at two or more speeds. For example, in one embodiment, the computing device can be operating at a first, or low power and speed. When the activation gesture is detected, the hardware of the computing device can be configured to switch to a second, high power and faster operating speed. Thus, the aspects of the disclosed embodiments can be configured to increase the processor and clock speed of the computing device when the activation gesture is identified. This can allow the computing device to add or increase the use of resources for detecting the second gesture and executing any corresponding command that is identified.

As another example of the hardware optimization provided by the aspects of the disclosed embodiments, the algorithm described herein is split into two "stages", one called "search 500" and the other one called "match 510". In one embodiment, the search 500 can run the search utilizing less resources. In a hardware adaptation, the search part will use less CPU power, or only one CPU core or even lower frequency to save the resources until the pre-defined activation shape is recognized. When that happens, the match 510 process will be kick started and full resources of the computing device can be used. That way, the aspects of the disclosed embodiments are more power friendly to "wearable devices" where the devices need to operate continuously.

Embodiments of the present disclosure can include portable computing device such as mobile phones, smart phones, tablets, laptops, head mounted devices, wearable computers, or other devices that can include a display, a camera (front or rear facing camera), memory, central processing unit, communication interface (such as cellular interface and/or wireless local area network/Bluetooth etc. interface), sensors such as accelerometers, position sensor such as Global System for Positioning (GPS). Users of the portable computing device can use a terminal with a user interface (UI). The typical user interface might include a display and some means of giving feedback such as touch screen or physical buttons. There are portable computing devices which can also receive user input via sensors such as accelerometers. Example of such usage can include controlling of a game by tilting the terminal. In addition to portable computing devices and terminals, some aspects of the present disclosure can be implemented in fixed devices such as desktop computers or embedded in for example a camera of a car or cash machine, food dispenser, home entertainment system.

According to embodiments of the disclosure, the camera of the portable computing device is used as feedback means to control a user interface or to initiate actions in the portable computing device. The feedback is given to the portable computing device as one or more different gestures made with one or more of the hands of the user.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A portable computing device including a camera configured to capture one or more images, a memory and a central processing unit, the central processing unit configured to analyze the image and detect and identify a first hand gesture of a user in the image, the central processing unit comprising computer readable code means, which when executed on the central processing unit are configured to:
    operate the portable computing device at a low power while searching for a predefined activation gesture in the captured image;
    operate the portable computing device at a higher power upon determining that the captured image includes the predefined activation gesture;
    detect a second gesture in the captured image;
    identify a command corresponding to the second gesture; and
    execute the command to perform a function in the portable computing device corresponding to the command.

2. The portable computing device of claim 1, wherein the central processing unit is configured to separate the first hand gesture from a background of the image and extract information from the first hand gesture.

3. The portable computing device of claim 2, wherein the central processing unit is configured to use the extracted information to analyze the second gesture to identify the command.

4. The portable computing device of claim 1, wherein the captured image is a real-time image.

5. The portable computing device of claim 1, wherein the captured image is a sequence of real-time images.

6. The portable computing device of claim 1, wherein the captured image is a video.

7. The portable computing device of claim 1, wherein the central processing unit is configured to determine that the captured image includes the predefined activation gesture by:
    detecting the first hand gesture in the captured image;
    comparing the first hand gesture in the captured image to a database of stored hand gestures; and
    determining that the first hand gesture corresponds to the pre-defined activation gesture.

8. The portable computing device according to claim 7, wherein determining that the first hand gesture corresponds to the pre-defined activation gesture comprises matching the first hand gesture to a registered hand gesture in the database of stored hand gestures, and wherein the central processing unit is configured to authenticate the user of the portable computing device when the first hand gesture is matched to a registered hand gesture.

9. The portable computing device of claim 1, wherein the extracted information comprises a color of the first hand gesture, a location of the first hand gesture in the image, a pose of the first hand gesture, a size of the first hand gesture, a shape of the first hand gesture or a motion of the first hand gesture.

10. The portable computing device of claim 1, wherein the predefined activation gesture is in the form of a palm of a user's hand.

11. The portable computing device of claim 1, wherein the captured image includes an image of a hand of the user.

12. The portable computing device of claim 1, wherein the portable computing device comprises a mobile communication device, a computer, a head mounted device or a smart phone.

13. The portable computing device of claim 1, wherein the central processing unit is configured to:
    detect a shape in the captured image
    detect a background in the captured image;
    separate the detected shape from the background;
    extracting information from the separated shape, the information comprising at least a color, location and size of the separated shape;
    using the extracted information to analyze the detected second gesture to identify the command.

14. The portable computing device of claim 13, wherein the central processing unit is configured to separate the detected shape from the background using a motion vector, edge detection, shape detection and/or color detection.

15. The portable computing device of claim 1, further comprising a feedback device, wherein the central processing unit is configured to cause the feedback device to provide one or more of a tactile, audio or visual feedback to the user prior to executing the command.

16. A method of interpreting a hand gesture in an image captured by an image capturing device communicatively coupled to a computing device, comprising using a processor of the computing device to:
    operate the portable computing device at a low power while detecting a first hand gesture in the captured image;
    operate the portable computing device at a higher power upon determining that the first hand gesture corresponds to an activation gesture;
    detect a subsequent hand gesture in the captured image;
    identify a command corresponding to the subsequent hand gesture, the command being configured to execute an action in the computing device when the command is triggered; and
    execute the command in the computing device.

17. The method of claim 16, wherein determining that the first hand gesture is the activation gesture comprises matching the first hand gesture to hand gesture images stored in a database of pre-defined hand gestures.

18. The method of claim 16, wherein after the first hand gesture is determined to be the activation gesture, the processor is configured to separate the first hand gesture from a background of the captured image and extract information from the first hand gesture that is used to analyze the subsequent hand gesture to identify the command.

19. The method of claim 18, wherein the information comprises a color of the first hand gesture, a location of the first hand gesture in the image, a size of the first hand gesture or a shape of the first hand gesture.

20. The method of claim 18, wherein the processor is configured to:
    detect a shape in the captured image;
    detect the background in the captured image;
    separate the detected shape from the background;
    extracting information from the separated shape, the information comprising at least a color, location and size of the separated shape;
    using the extracted information to analyze the detected subsequent hand gesture to identify the command.

* * * * *